(12) United States Patent
Luo et al.

(10) Patent No.: US 7,049,809 B2
(45) Date of Patent: May 23, 2006

(54) SYSTEM, METHOD, AND APPARATUS FOR HANDLING AND TESTING INDIVIDUAL SLIDERS IN A ROW-LIKE FORMAT IN SINGLE SLIDER PROCESSING SYSTEMS

(75) Inventors: Jih-Shiuan Luo, San Jose, CA (US); Ali Sanayei, San Jose, CA (US); Darrick Taylor Smith, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 30 days.

(21) Appl. No.: 10/891,777

(22) Filed: Jul. 15, 2004

(65) Prior Publication Data

US 2006/0012360 A1  Jan. 19, 2006

(51) Int. Cl.
*G01R 33/12* (2006.01)
*G01R 31/28* (2006.01)

(52) U.S. Cl. .................... 324/210; 324/158.1
(58) Field of Classification Search ...... None
See application file for complete search history.

(56) References Cited

U.S. PATENT DOCUMENTS

| | | | |
|---|---|---|---|
| 3,710,235 A | 1/1973 | Barrager et al. | |
| 5,745,983 A | 5/1998 | Quintana et al. | |
| 5,821,746 A * | 10/1998 | Shelor | 324/210 |
| 5,896,729 A | 4/1999 | Bell et al. | |
| 6,040,702 A | 3/2000 | Hembree et al. | |
| 6,093,083 A | 7/2000 | Lackey | |
| 6,261,165 B1 * | 7/2001 | Lackey et al. | 451/387 |
| 6,486,660 B1 * | 11/2002 | Luse et al. | 324/210 |
| 6,538,430 B1 | 3/2003 | Carrington et al. | |
| 6,553,644 B1 | 4/2003 | Karmaniolas et al. | |
| 6,943,971 B1 * | 9/2005 | Kainuma et al. | 360/31 |
| 2001/0033179 A1 | 10/2001 | DiFrancesco | |
| 2003/0148753 A1 | 8/2003 | Egami | |

FOREIGN PATENT DOCUMENTS

| | | |
|---|---|---|
| JP | 2233388 | 9/1990 |
| JP | 4322961 | 11/1992 |
| JP | 11016115 | 1/1999 |
| JP | 11339237 | 12/1999 |
| JP | 2002321154 | 11/2002 |

OTHER PUBLICATIONS

"Manufacture of Air Bearing Magnetic Head Sliders", IBM Technical Disclosure Bulletin, May 1980, pp. 5434–5435; 80A 02708/02-350.P15/SA8790277.

* cited by examiner

*Primary Examiner*—Jermele Hollington
*Assistant Examiner*—Jimmy Nguyen
(74) *Attorney, Agent, or Firm*—Bracewell & Giuliani LLP

(57) ABSTRACT

A device for handling and testing individual sliders in a row-like format utilizes an elongated, row-like holder having a series of small pockets, each of which receives a single slider. After the sliders enter the holder, a clamp is moved to a closed position to retain the sliders in the holder. The holder is placed in a test fixture such that permanently mounted probes precisely engage the small pads on the sliders for multiple testing purposes. Enlarged probe pads on the test fixture are electrically interconnected with the probes to provide an operator with easy access to the slider pads. The sliders are tested in a row-like format, side by side, to reduce handling-induced electrostatic discharge and mechanical damage.

24 Claims, 6 Drawing Sheets

SYSTEM, METHOD, AND APPARATUS FOR HANDLING AND TESTING INDIVIDUAL SLIDERS IN A ROW-LIKE FORMAT IN SINGLE SLIDER PROCESSING SYSTEMS

BACKGROUND OF THE INVENTION

1. Technical Field

The present invention relates in general to improved processing of individual disk drive sliders and, in particular, to an improved system, method, and apparatus for handling and testing individual ones of the sliders in single slider processing systems.

2. Description of the Related Art

Magnetic recording is employed for large memory capacity requirements in high speed data processing systems. For example, in magnetic disk drive systems, data is read from and written to magnetic recording media utilizing magnetic transducers commonly referred to as magnetic heads. Typically, one or more magnetic recording disks are mounted on a spindle such that the disk can rotate to permit the magnetic head mounted on a moveable arm in position closely adjacent to the disk surface to read or write information thereon.

During operation of the disk drive system, an actuator mechanism moves the magnetic transducer to a desired radial position on the surface of the rotating disk where the head electromagnetically reads or writes data. Usually the head is integrally mounted in a carrier or support referred to as a "slider." A slider generally serves to mechanically support the head and any electrical connections between the head and the rest of the disk drive system. The slider is aerodynamically shaped to slide over moving air and therefore to maintain a uniform distance from the surface of the rotating disk thereby preventing the head from undesirably contacting the disk.

Typically, a slider is formed with essentially planar areas surrounded by recessed areas etched back from the original surface. The surface of the planar areas that glide over the disk surface during operation is known as the air bearing surface (ABS). Large numbers of sliders are fabricated from a single wafer having rows of the magnetic transducers deposited simultaneously on the wafer surface using semiconductor-type process methods.

After deposition of the heads is complete, single-row bars are sliced from the wafer, each bar comprising a row of units which can be further processed into sliders having one or more magnetic transducers on their end faces. Each row bar is bonded to a fixture or tool where the bar is processed and then further diced, i.e., separated into sliders having one or more magnetic transducers on their end faces. Each row bar is bonded to a fixture or tool where the bar is processed and then further diced, i.e., separated into individual sliders each slider having at least one magnetic head terminating at the slider ABS.

The slider head is typically an inductive electromagnetic device including magnetic pole pieces which read the data from or write the data onto the recording media surface. In other applications the magnetic head may include a magneto resistive read element for separately reading the recorded data with the inductive heads serving only to write the data. In either application, the various elements terminate on the ABS and function to electromagnetically interact with the data contained on the magnetic recording disk.

In order to increase the efficiency of the magnetic heads, the sensing elements must have precision dimensional relationships to each other as well as the application of the slider ABS to the magnetic recording disk. Each head has a polished ABS with flatness parameters, such as crown, camber, and twist. The ABS allows the head to "fly" above the surface of its respective spinning disk. In order to achieve the desired fly height, fly height variance, take-off speed, and other aerodynamic characteristics, the flatness parameters of the ABS need to be tightly controlled.

For component level testing, it is considerably easier to test the entire row of sliders for the following reasons: (1) it is much easier to handle rows rather than the individual sliders because of their physical dimensions; (2) it is less likely to damage (e.g., mechanical and electrostatic discharge) sliders on rows from handling; (3) the fixture requirements for placing the rows onto the tester are less stringent; (4) probing alignment on rows is much easier to do than on individual sliders because (a) the pitch distance between the sliders on rows is essentially fixed, and (b) the height of one slider relative to the others is essentially identical and miss-probing is less likely to occur. However, the yield on a single row may be quite poor. For low yield rows, the throughput for testing is low and testing more rows to increase sample size for obtaining statistical meaningful data is required, i.e., longer test time, which can impact product monitoring or design evaluation significantly. For slider-level component testing, one only places good sliders for measurements. In addition, today the trend is moving toward single slider lapping. Since component level testing is only meaningful on lapped devices, there may be no more row-level component testing in the future.

SUMMARY OF THE INVENTION

One embodiment of a system, method, and apparatus for handling and testing individual sliders in a row-like format is disclosed. The invention comprises an elongated, row-like holder having a series of small pockets, each of which receives a single slider. The sliders may comprise pico or femto-sized sliders, and the holders are sized accordingly. A manually actuated clamp is moved to a closed position to retain the sliders in the holder. The holder is placed in a test fixture wherein permanently mounted probes precisely engage the miniature pads on the sliders for multiple testing purposes. Enlarged probe pads on the test fixture are electrically interconnected with the probes to provide an operator with easy access to the slider pads.

After testing, any defective sliders may be individually removed from the holder such that subsequent testing only measures defect code zero sliders. The large size of the probe pads also allows the operator to use a less expensive probe card for the various tests. The sliders are tested in a row-like format, side by side. In one embodiment, two rows are measured simultaneously in a thermal stability test. The design of the present invention reduces handling-induced electrostatic discharge (ESD), and mechanical stress and damage. In addition, the sliders may be pre-loaded and stored as "rows" in the holders before measurements are required.

A loader with a robotic slider picker, which is integrated with the slider holder for loading the sliders into the slider holder or unloading the sliders from the slider holder, significantly reduces manual handling of the sliders by manufacturing personnel. Manual handlings are prone to mechanical and electrostatic discharge damage of the sliders. In addition, the enlarged probe pads of the present invention reduce ESD damages due to intermittent contacts from electrical probing. The size of the contact pads on the slider bodies are smaller for femto sliders than they are for pico sliders. As a result, any probing-induced ESD is worsened on femto sliders. The present invention reduces such negative impacts because the dimension of probe pads on the slider holder may be identical for both pico and femto sliders.

The microscopic dimension variation between the two types of sliders can increase the difficulties of probing multiple sliders. The present invention accommodates the variation on slider dimensions without impacting the electrical probing on individual sliders. If needed, both pico and femto sliders may be tested together by joining the pico and femto slider holders together. Significantly, testing different sized sliders together was not considered possible in the prior art.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 5:
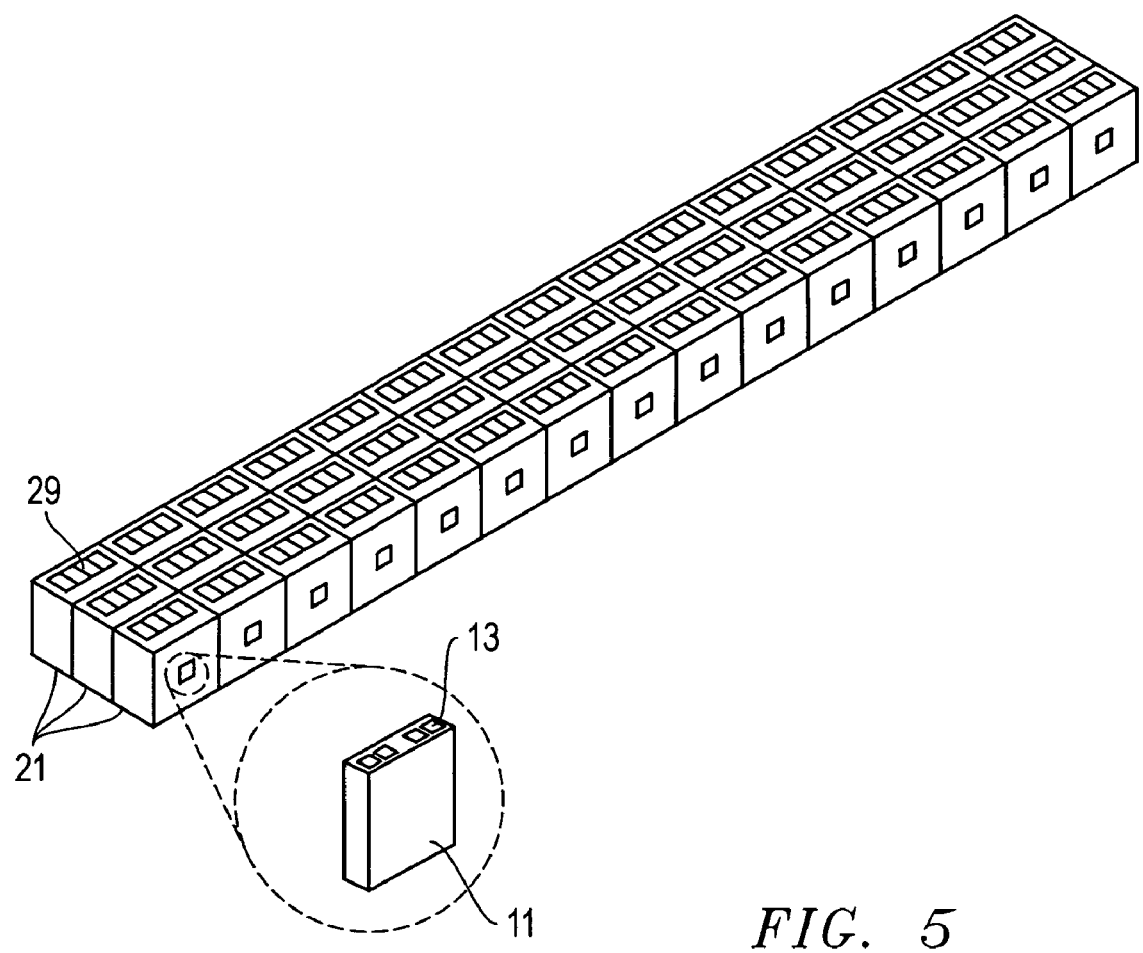
FIG. 5 is an isometric view of a joined set of the holders of FIG. 1, and is constructed in accordance with the present invention.
Figure 6:
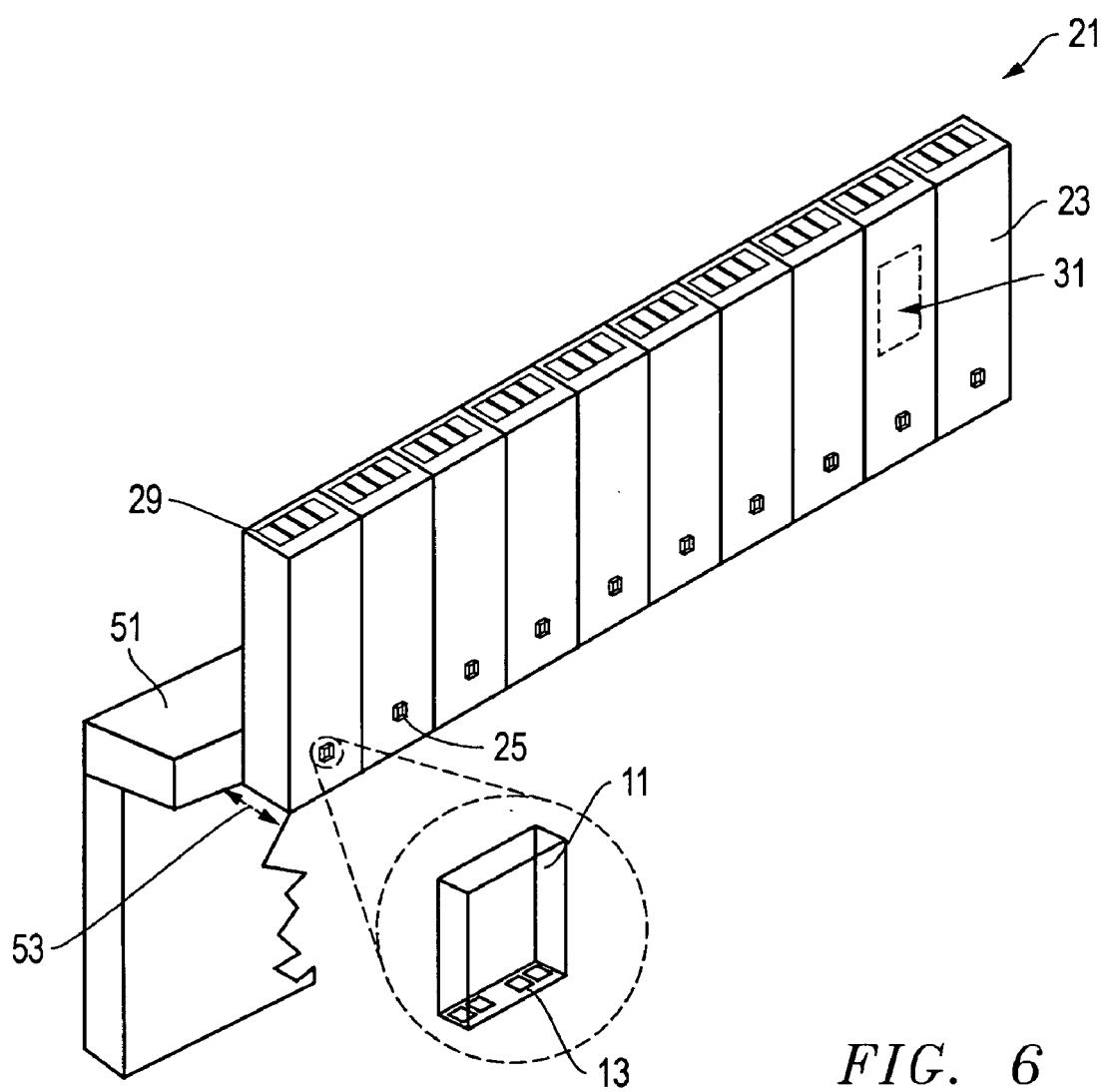
FIG. 6 is an isometric view of the slider holder of FIG. 1 in operation, and is constructed in accordance with the present invention.

Referring to FIGS. 1–9, one embodiment of a system, method, and apparatus for handling and testing workpieces, such as hard disk drive sliders, is shown. The present invention is designed to reduce handling-induced electrostatic discharge and mechanical stress and damage to workpieces. As shown in FIGS. 5 and 6, each of the sliders 11 has a generally rectangular block-like shape, and a plurality (four shown) of contact pads 13 formed thereon.

Figure 1:
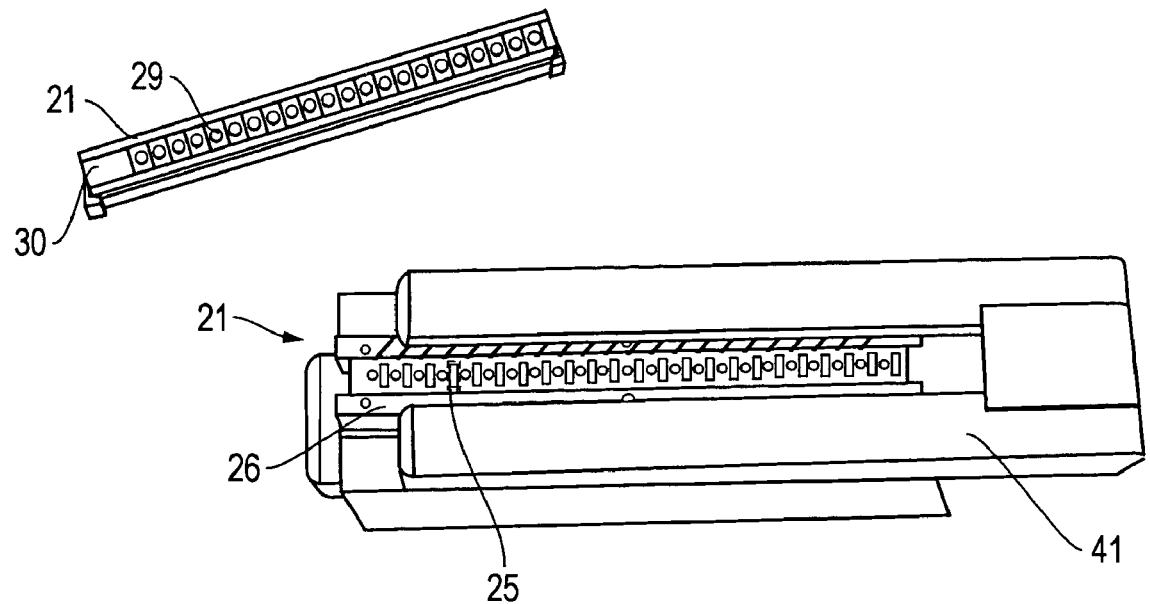
FIG. 1 is a top view of one embodiment of a slider holder and a slider loader constructed in accordance with the present invention.
Figure 2:
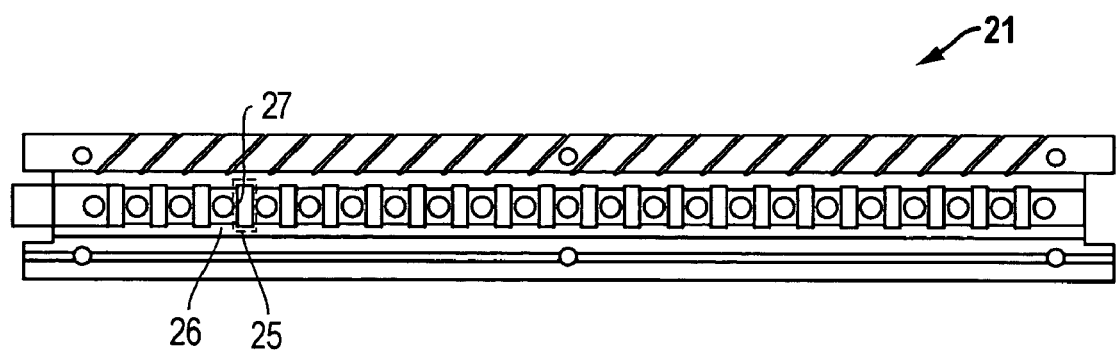
FIG. 2 is an enlarged top view of the slider holder of FIG. 1, and is constructed in accordance with the present invention.
Figure 3:
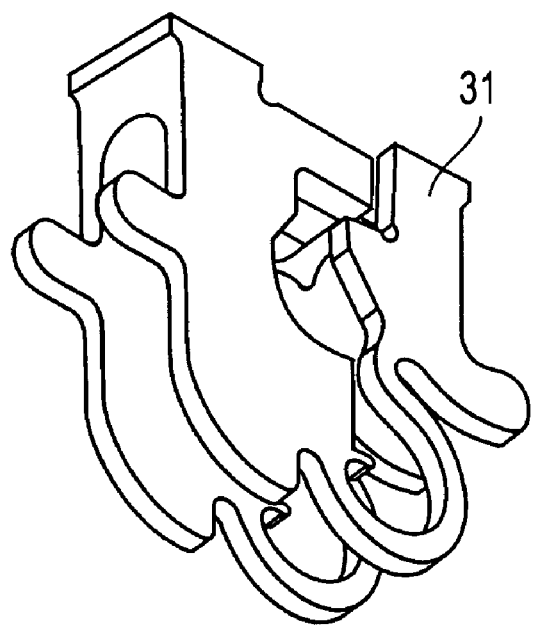
FIG. 3 is an enlarged isometric view of one embodiment of a slider clamp utilized by the slider holder of FIG. 1, and is constructed in accordance with the present invention.
Figure 4:
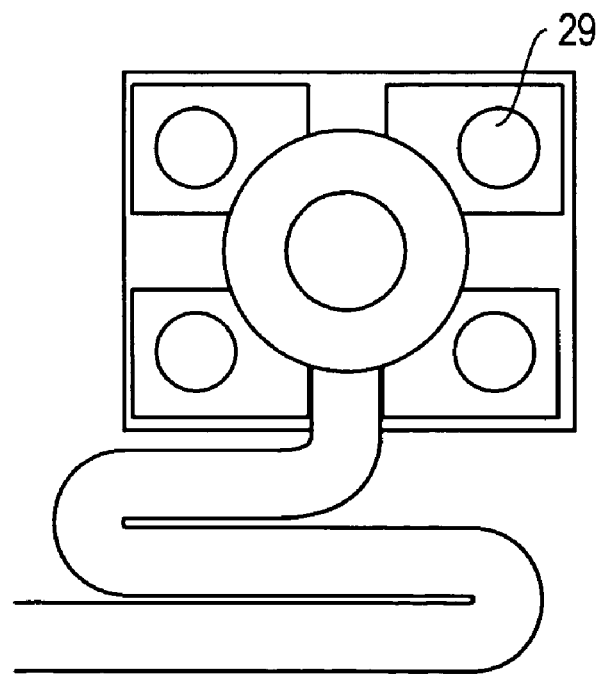
FIG. 4 is an enlarged top view of one embodiment of a single set of probe pads utilized by the slider holder of FIG. 1, and is constructed in accordance with the present invention.

The sliders 11 are selectively mounted in a slider holder 21 (FIGS. 1, 2, and 6). Depending on the slider size (e.g., pico or femto), separate slider holders are provided. One embodiment of slider holder 21 has an elongated rectangular profile and arrays the sliders 11 side-by-side in a row-like configuration. As shown in FIG. 5, multiple ones of the slider holders 21 may be joined together for simultaneous measurements of the sliders 11 contained therein.

Each slider holder 21 is segmented into a plurality units 23. Each unit 23 is designed for and interacts with one slider 13. Each unit 23 has an internal slider pocket 25 formed therein, preferably in the bottom surface 26 (FIG. 2) of slider holder 21. Each of the pockets 25 receives one of the sliders 11, and each of the pockets 25 has probes 27 (FIG. 2) that are complementary to and align with the slider contact pads 13 for engagement therewith. Although probes 27 are shown on the sides of pockets 25, they may be located elsewhere in pockets 25 as long as they can make contact with the contacts of sliders 13.

Each set of the probes 27 are electrically interconnected with a plurality of probe pads 29 (FIGS. 1 and 4) that are formed on the exterior of the slider holder 21. In the version shown, the probe pads 29 are formed on an opposite side (i.e., the top surface 30 in FIG. 1) of slider holder 21. The probe pads 29 are significantly larger than the slider contact pads 13 to provide an operator with quick and easy electrical access to the slider contact pads 13. For example, in one embodiment the probe pads 29 are approximately 1800μ by 1400μ, versus 145μ by 138μ micron pads on pico sliders, and 104μ by 104μ pads on femto sliders.

Figure 7:
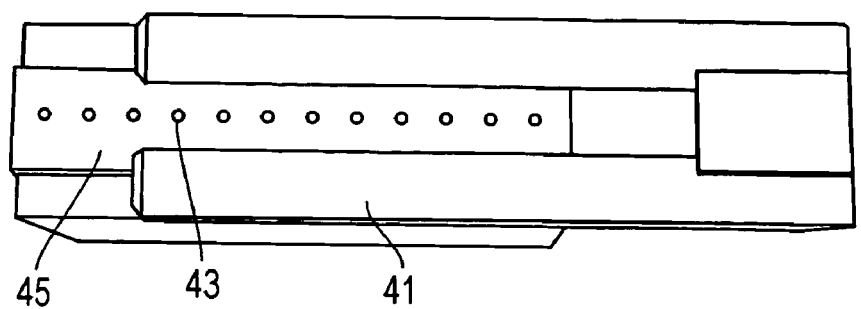
FIG. 7 is a top view of the slider loader of FIG. 1 shown unloaded, and is constructed in accordance with the present invention.

The slider holder 21 further comprises a mechanism 31 (FIG. 6) for locking and retaining the sliders 11 in the slider holder 21, and for unlocking and releasing the sliders 11 from the slider holder 21. The mechanism may comprise a manually-actuated clamp (FIG. 3) in each of the pockets 25 for selectively engaging a respective one of the sliders 11 in response to actuation of an actuator 43 on a slider loader 41 (FIG. 7). The slider loader 41 has a receptacle 45 for receiving the slider holder 21 and the actuator 43 manipulates the mechanism 31 to load and unload sliders 11 with respect to the slider holder 21.

The mechanism 31 may be configured to simultaneously interact with all of the sliders 11 in the slider holder 21. Alternatively, the mechanism 31 may comprise a plurality of mechanisms that individually interact with a respective one of the sliders 11 in the slider holder 21, such that each mechanism must be individually actuated to retain or release a respective one of the sliders 11.

The present invention further comprises a retention device 51 (FIG. 6) for retaining the slider holder 21 during operations. Typically, the slider holder 21 is inverted (FIG. 1) with its bottom side 26 up when mounted to the slider loader 41 to expose the pockets 25 therein. The slider holder 21 is reoriented (FIG. 6) with its top side up when mounted to the retention device 51 to expose the probe pads 29 thereon.

The retention device 51 may further comprise a magnet having a magnetic field 53 that retains the slider holder 21 on the retention device 51. After testing, any sliders 11 that are defective and located in the slider holder 21 are individually removed from the slider holder 21 by selective actuation of the mechanism 31 in the slider holder 21, such that subsequent testing only measures the good sliders 11 remaining in the slider holder 21.

Figure 8:
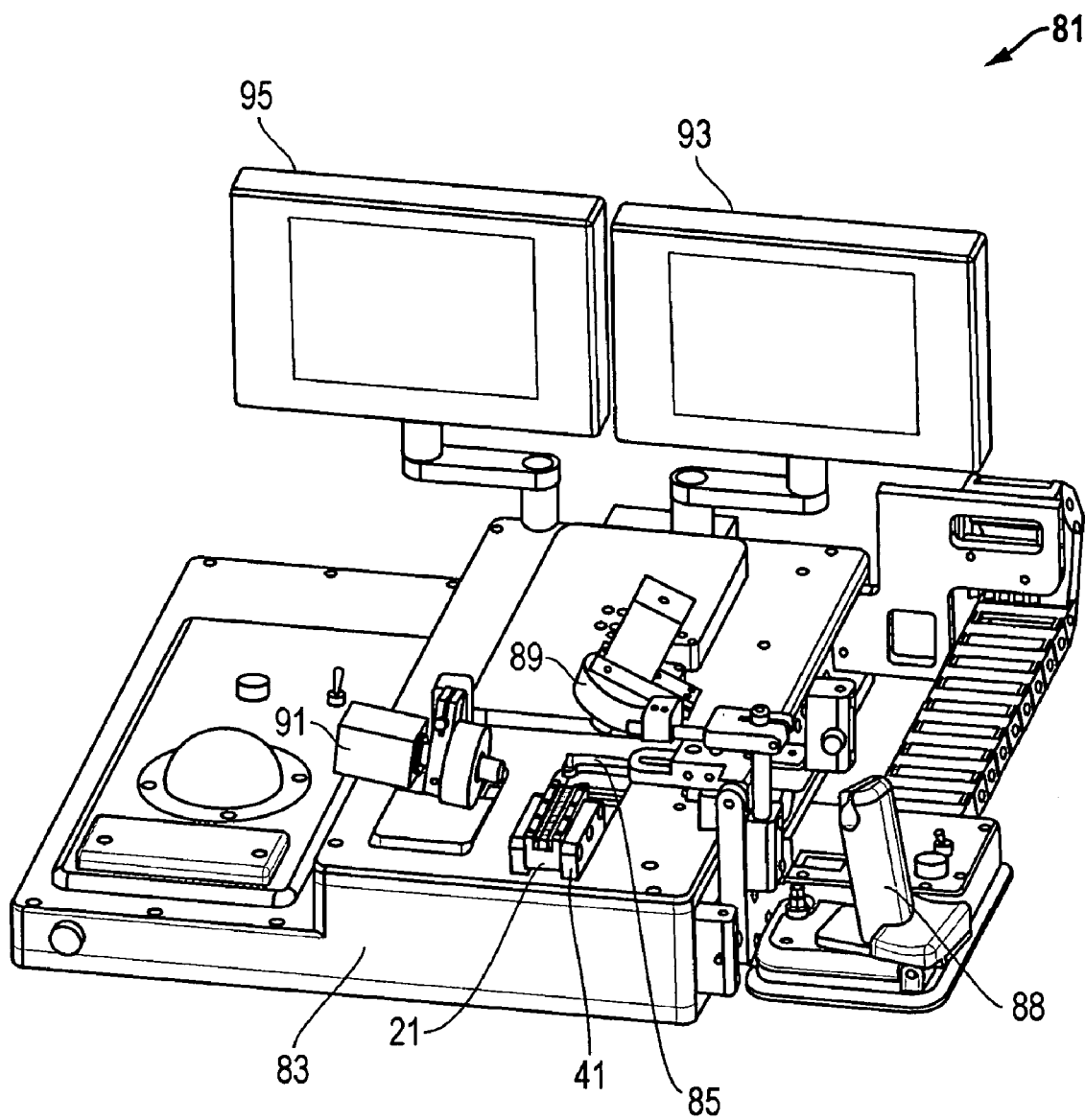
FIG. 8 is an isometric view of one embodiment of a system for manipulating the slider loader and slider holder of FIG. 1, and is constructed in accordance with the present invention.
Figure 9:
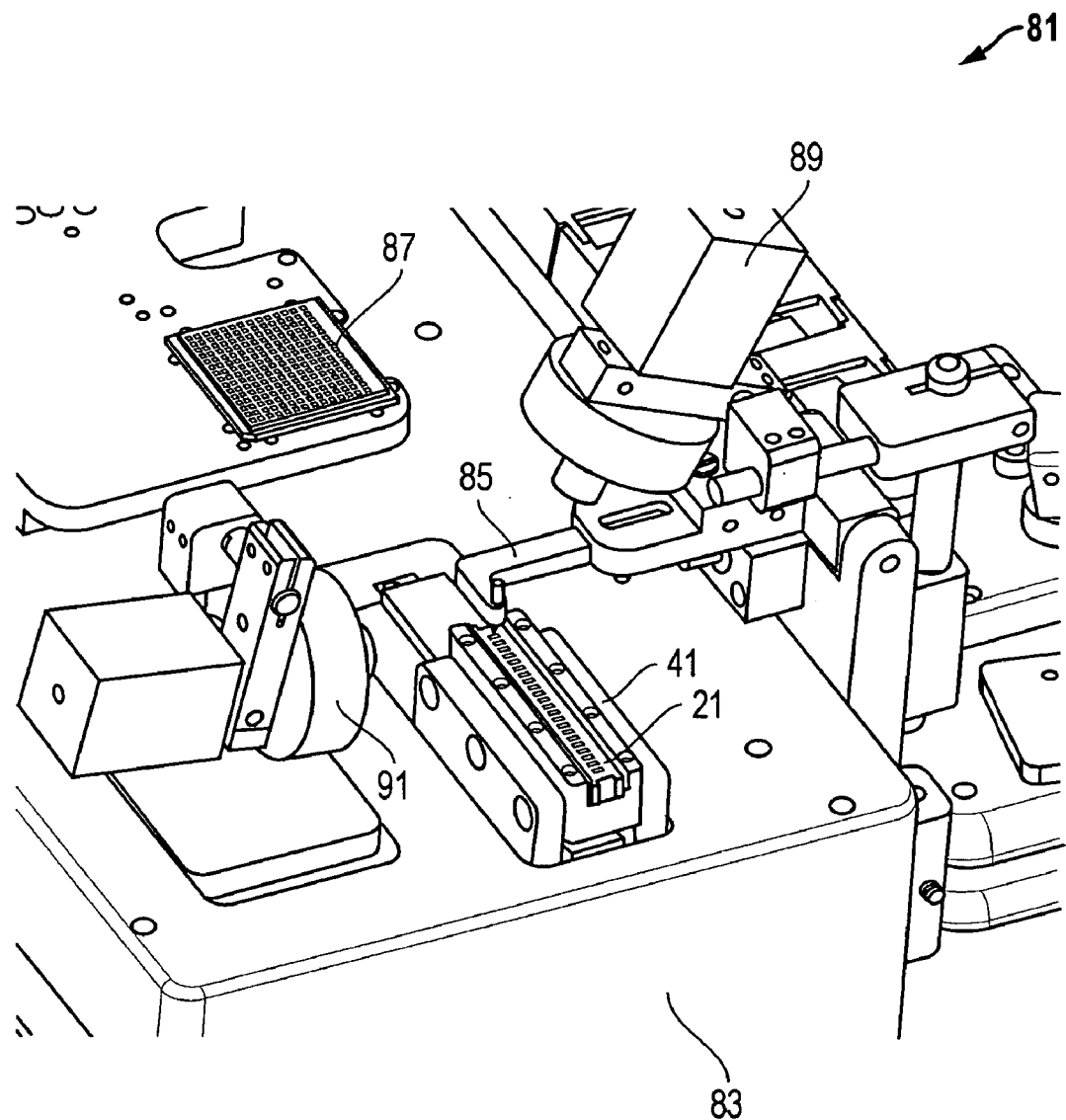
FIG. 9 is an enlarged isometric view of the system of FIG. 8, and is constructed in accordance with the present invention.

Referring now to FIGS. 8 and 9, one embodiment of a system 81 that employs the previously described components is shown. Slider holder 21 and slider loader 41 are mounted to a base unit 83 so that a slider manipulator 85 with index can pick and place sliders from a slider matrix tray 87 into the slider holder 21. The slider manipulator 85 is preferably computer controlled and robotically automated, but also may be manually controlled as with, for example, a joy stick 88. Cameras 89, 91 for both the handling sliders and reading sliders, respectively, are provided. Images from cameras 89, 91 are provided at displays 93, 95, respectively.

The present invention also comprises a method of handling and testing workpieces or sliders to reduce handling-induced electrostatic discharge and mechanical stress and damage thereto. The method comprises providing a plurality of sliders 11, each having a plurality of contact pads 13 formed thereon; loading a slider holder 21 in a slider loader 41; actuating the slider holder 21 with the slider loader 41 to receive the sliders 11; loading the sliders 11 in a plurality of pockets 25 formed in the slider 11, each of pockets 25 receiving one of the sliders 11; actuating the slider holder 21 with the slider loader 41 to lock the sliders 11 in the pockets 25; engaging the slider contact pads 13 with complementary probes 27 (FIG. 2) in each of the pockets 25; and then electrically accessing the sliders 11 via probe pads 29 formed on an exterior of the slider holder 21, the probe pads 29 being electrically interconnected with respective ones of the probes 27 and, thus, respective ones of the slider contact pads 13.

The method may further comprise mounting the slider holder 21 to a retention device 51 during operations, and retaining the slider holder 21 on the retention device 51 with a magnet having a magnetic field 53. The method also may comprise actuating a clamp 31 (FIGS. 3 and 6) in each of the pockets 25 for selectively engaging a respective one of the sliders 11 in response to actuation of the slider loader 41. In addition, the method typically further comprises configuring the probe pads 29 (FIG. 4) significantly larger than the slider contact pads 13 to provide an operator with quick and easy electrical access to the slider contact pads 13.

The method also comprises arraying the sliders 11 side-by-side in a row-like configuration and, after testing, individually removing any defective sliders located in the slider holder 21 by selective actuation of the slider holder 21 such that subsequent testing only measures the sliders 11 remaining in the slider holder 21. Furthermore, the method may further comprise joining multiple ones of the slider holders 21 together (FIG. 5) for simultaneous measurements of the sliders 11 contained therein.

During operation, the method comprises inverting the slider holder 21 in the slider loader 41 (FIG. 1) to expose the pockets 25 therein, and reorienting the slider holder 21 (FIG. 6) to expose the probe pads 29 thereon. The method may comprise locating the probes 27 in interiors of the pockets 25, and locating the probe pads 29 on an exterior of the slider holder 21. The method also may comprise simultaneously interacting with all of the sliders 11 in the slider holder 21, or individually interacting with respective ones of the sliders 11 in the slider holder 21, such that each slider 11 is individually retained or released.

The present invention has several advantages, including the ability to move manufacturing from row processing to single slider processing, and from pico-sized sliders to femto-sized sliders. The invention improves throughput, ESD reliability, and sensor probing capabilities by manipulating the individual sliders as a row of sliders. Since the bond pads are not scaled in size when going from pico to femto sliders, any probing issues with regard to femto sliders is resolved. The slider loader and reader reads the slider identifying information and accesses quality-related data. The testing of femto sliders is not more difficult that pico sliders since the loading procedures are similar, and the overall dimension of the row holder is identical, even though the pocket size for the femto slider is smaller. The larger size of the bond and probe pads permit usage of different types of lower cost probe cards.

In one embodiment of the present invention, the slider holder assembly is subjected to a temperature range of −20° C. to 150° C. The electrical wiring from the slider contact pads to the probe pads is relatively short to reduce ringing for high frequency measurements (e.g., nanosecond-waveform). One version of the holder supports 15 sliders in a span of only three inches. The slider locking/clamping mechanism does not require a gimbal-type assembly, and the sliders are uploaded/downloaded between the holder and loader with ease.

While the invention has been shown or described in only some of its forms, it should be apparent to those skilled in the art that it is not so limited, but is susceptible to various changes without departing from the scope of the invention.

What is claimed is:

1. A system for handling and testing sliders to reduce handling-induced electrostatic discharge and mechanical stress and damage thereto, each of the sliders having a plurality of contact pads formed thereon, the system comprising:

a slider holder having a plurality of pockets formed therein, each of the pockets receiving one of the sliders, and each of the pockets having probes that are complementary to and align with the slider contact pads for engagement therewith, the probes being electrically interconnected with a plurality of probe pads formed on the slider holder, and the slider holder further comprising a mechanism for locking and retaining the sliders in the slider holder, and for unlocking and releasing the sliders from the slider holder; and a slider loader having a receptacle for receiving the slider holder and an actuator for manipulating the mechanism to load and unload sliders with respect to the slider holder.

2. The system of claim 1, wherein the mechanism comprises a clamp in each of the pockets for selectively engaging a respective one of the sliders in response to actuation of the actuator on the slider loader.

3. The system of claim 1, wherein the probe pads are significantly larger than the slider contact pads to provide an operator with quick and easy electrical access to the slider contact pads.

4. The system of claim 1, wherein the slider holder arrays the sliders side-by-side in a row-like configuration, and multiple ones of the slider holders are joined together for simultaneous measurements of the sliders contained therein.

5. The system of claim 1, wherein, after testing, any defective sliders located in the slider holder are individually removed from the slider holder by selective actuation of the mechanism in the slider holder such that subsequent testing only measures the sliders remaining in the slider holder.

6. The system of claim 1, further comprising a retention device for retaining the slider holder during operations; wherein the retention device further comprises a magnet having a magnetic field that retains the slider holder on the retention device; and wherein the slider holder is inverted when mounted to the slider loader to expose the pockets therein, and the slider holder is reoriented when mounted to the retention device to expose the probe pads thereon.

7. The system of claim 1, wherein the probes are located in interiors of the pockets, and the probe pads are located on an exterior surface of the slider holder.

8. The system of claim 1, wherein the mechanism simultaneously interacts with all of the sliders in the slider holder.

9. The system of claim 1, wherein the mechanism comprises a plurality of mechanisms that individually interact with a respective one of the sliders in the slider holder, such that each mechanism must be actuated to retain or release a respective one of the sliders.

10. A method of handling and testing sliders to reduce handling-induced electrostatic discharge and mechanical stress and damage thereto, the method comprising:
(a) providing a plurality of sliders, each having a plurality of contact pads formed thereon;
(b) loading a slider holder in a slider loader;
(c) actuating the slider holder with the slider loader to receive the sliders;
(d) loading the sliders in a plurality of pockets formed in the slider, each of pockets receiving one of the sliders;
(e) actuating the slider holder with the slider loader to lock the sliders in the pockets;
(f) engaging the slider contact pads with complementary probes in each of the pockets;
(g) electrically accessing the sliders via probe pads formed on an exterior of the slider holder, the probe pads being electrically interconnected with respective ones of the probes and, thus, respective ones of the slider contact pads.

11. The method of claim 10, further comprising mounting the slider holder to a retention device during operations, and retaining the slider holder on the retention device with a magnet having a magnetic field.

12. The method of claim 10, wherein steps (c) through (e) comprise actuating a clamp in each of the pockets for selectively engaging a respective one of the sliders in response to actuation of the slider loader.

13. The method of claim 10, further comprising configuring the probe pads significantly larger than the slider contact pads to provide an operator with quick and easy electrical access to the slider contact pads.

14. The method of claim 10, wherein step (d) comprises arraying the sliders side-by-side in a row-like configuration.

15. The method of claim 10, further comprising, after testing, individually removing any defective sliders located in the slider holder by selective actuation of the slider holder such that subsequent testing only measures the sliders remaining in the slider holder.

16. The method of claim 10, further comprising joining multiple ones of the slider holders together for simultaneous measurements of the sliders contained therein.

17. The method of claim 10, wherein step (b) comprises inverting the slider holder in the slider loader to expose the pockets therein, and step (g) comprises reorienting the slider holder to expose the probe pads thereon.

18. The method of claim 10, further comprising locating the probes in interiors of the pockets, and locating the probe pads on an exterior of the slider holder.

19. The method of claim 10, wherein step (e) comprises one of simultaneously interacting with all of the sliders in the slider holder, and individually interacting with respective ones of the sliders in the slider holder, such that each slider is individually retained or released.

20. A system for handling and testing sliders to reduce handling-induced electrostatic discharge and mechanical stress and damage thereto, each of the sliders having a plurality of contact pads formed thereon, the system comprising:
a slider holder having a plurality of pockets formed therein, each of the pockets receiving one of the sliders, and each of the pockets having interior probes that are complementary to and align with the slider contact pads for engagement therewith, the interior probes being electrically interconnected with a plurality of probe pads formed on an exterior of the slider holder, the probe pads being significantly larger than the slider contact pads to provide an operator with quick and easy electrical access to the slider contact pads, and the slider holder further comprising a mechanism for locking and retaining the sliders in the slider holder, and for unlocking and releasing the sliders from the slider holder;
a slider loader having a receptacle for receiving the slider holder and an actuator for manipulating the mechanism to load and unload sliders with respect to the slider holder; and wherein
multiple ones of the slider holders are joined together for simultaneous measurements of the sliders contained therein, and the slider holder arrays the sliders side-by-side in a row-like configuration.

21. The system of claim 20, wherein the mechanism comprises a clamp in each of the pockets for selectively engaging a respective one of the sliders in response to actuation of the actuator on the slider loader.

22. The system of claim 20, wherein, after testing, any defective sliders located in the slider holder are individually removed from the slider holder by selective actuation of the mechanism in the slider holder such that subsequent testing only measures the sliders remaining in the slider holder.

23. The system of claim 20, wherein the mechanism simultaneously interacts with all of the sliders in the slider holder.

24. The system of claim 20, wherein the mechanism comprises a plurality of mechanisms that individually interact with a respective one of the sliders in the slider holder, such that each mechanism must be actuated to retain or release a respective one of the sliders.

* * * * *